UNITED STATES PATENT OFFICE.

PAUL CASAMAJOR, OF BROOKLYN, NEW YORK; LOUISE JANE CASAMAJOR EXECUTRIX OF SAID PAUL CASAMAJOR, DECEASED.

TREATMENT OF CINCHONA-BARK.

SPECIFICATION forming part of Letters Patent No. 378,233, dated February 21, 1888.

Original application filed March 26, 1887, Serial No. 232,580. Divided and this application filed September 23, 1887. Serial No. 250,490. (No specimens.)

*To all whom it may concern:*

Be it known that I, PAUL CASAMAJOR, of Brooklyn, in the county of Kings and State of New York, have invented a new and useful Improvement in the Treatment of Cinchona-Barks, which improvement is fully set forth in the following specification.

This invention has reference to the treatment of cinchona or Peruvian barks for the extraction therefrom of their medicinal principles, and has for its object the more complete removal and utilization of such valuable constituents than is attainable with the methods of treatment now in vogue. According to this invention the bark is treated first with an alkali, and after standing some time is washed in a percolator, or successive quantities of water added, the clear solution then being separated from the solid particles. This solution contains the natural acids of the bark. The bark is then treated in like manner with an acid for removal of the natural alkaloids, and this solution is separated from the solid particles. The acid solution is then treated with a slight excess of an alkali to cause precipitation of the alkaloids, and the alkaline solution is treated with an excess of acid to precipitate the natural acids, and the two precipitates are mixed together, forming a new medicinal compound or preparation.

In carrying out my invention I take a suitable quantity of ground cinchona-bark and add thereto just sufficient water to make a moderately thin paste. To this I add gradually an alkali or alkaline carbonate (preferably ammonia hydrate or carbonate of soda) in such quantity that the mixture becomes distinctly alkaline. After allowing the mixture to stand for, say, a quarter or half an hour, it is again tested, and if not sufficiently alkaline more alkali is added. After this the mixture is thrown on a filter or percolator and washed continuously until the liquid that passes through clear is no longer distinctly bitter; or, instead of this treatment, a quantity of water may be added to the alkaline mixture or paste, and after sufficient stirring the solid particles may be allowed to settle, and the clear supernatant solution poured off and filtered. More water is then poured on the paste and the operation repeated until the ground bark is sufficiently exhausted. The solution thus obtained contains the acid constituents of the bark, combined with ammonia, potassa, or soda, according to the alkali used. This solution is then put aside for further use. The ground bark, which has thus been freed from its acid constituents, is now treated with dilute acid (say sulphuric or hydrochloric acid) until the proportion of acid be such that the mixture or paste remains distinctly acid. This mixture is now thrown on a filter or a percolator and washed until the clear solution passing through no longer shows decided bitterness. The solutions from the acid treatment are also put aside for future use. The filtration of these acid solutions is easy and rapid, so that there is no necessity to resort to decantation. Instead of treating the bark first by an alkali and then by an acid, the reverse process could be followed—*i. e.*, treating first with an acid and then with an alkali—with equally good results. Furthermore, after the double treatment, as described, the bark could be treated again in the same manner, if the first treatment has not entirely removed the active principles. The next step is to add to the acid solution a slight excess of an alkali, (such as ammonia,) and to the alkaline solution a slight excess of an acid, (such as hydrochloric acid,) the effect being to precipitate the alkaloids from the acid solution and the acids from the alkaline solution. These precipitates while wet are thoroughly mixed, and the resulting mixture, after being dried, is ready for use.

I am aware that cinchona-barks have been treated by solutions of caustic potassa and caustic soda for the removal of the natural acids of the bark, so as to facilitate the subsequent treatment by mineral acids to remove the alkaloids of the bark; but I have found that in carrying out my invention a special advantage attaches to the use of alkaline carbonates, such as carbonate of soda or potassa, instead of caustic alkali, since in using the latter a magma is formed which cannot be washed out and freed from the compound formed by the caustic alkali previous to the treatment with acids, while after treatment with an alkaline carbonate the mass remains sufficiently porous to be washed. A small quantity of carbonate of soda has sometimes been used, together with lime, for the treatment of bark; but the lime being greatly in excess, the result is a mixture of lime with a small quantity of caustic soda and of carbonate of lime.

The treatment with caustic alkali has a tendency to destroy the alkaloids of the bark by converting them into other less valuable compounds, while the treatment with alkaline carbonates has no such effect. Ammonia and its carbonate may be used with equally good results; but they are expensive. I have further found that there is a special advantage in repeating the successive acid and alkaline treatments one or more times, and that in using an alkaline carbonate, as specified, the bark may be more completely exhausted of its alkaloids. Thus, after treating the bark, as described, with a weak solution, say, of sulphuric acid, and then exhausting by water, there will in a few hours be no more trace of bitterness. If, now, this bark be treated with carbonate of soda or its equivalent, as specified, and the soda-salts of quinotannic and other acids washed out, the bark may be again treated with a fresh quantity of weak sulphuric acid and a very bitter solution obtained. This indicates that the acids in the bark allowed only a portion of the alkaloids to be removed, and that after the treatment with alkaline carbonate and removal of these organic acids (there being no magma formed) the bark may by a subsequent acid treatment be completely exhausted of its alkaloids.

By my process, as described above, I produce a mixture containing in combination both the acid constituents of the bark and its natural alkaloids. The yield of this product is very great compared with that of the salts of the alkaloids as usually obtained, and the new product is superior to such salts as a tonic and febrifuge.

In a concurrent application for patent filed March 26, 1887, and numbered 232,580, of which the present is a division made by official requirement, I have described and claimed a process of treating cinchona-barks which differs from that claimed herein in that, instead of separately treating the acid and alkaline solutions to precipitate the alkaloids and acids, respectively, and then mixing the precipitates, the two solutions are themselves mixed, whereby the natural acids and alkaloids of the bark combine and form a precipitate, which is separated from the solution and dried for use.

I claim herein—

1. The process of extracting the medicinal constituents of cinchona-barks by treating the same bark successively with an acid and with an alkali, then precipitating the acids from the alkaline solution and the alkaloids from the acid solution and mixing the precipitates, substantially as described.

2. As a new manufacture, the medicinal preparation described, the same consisting of the alkaloids and acids of cinchona-barks precipitated from the same bark and mixed together, substantially as set forth.

3. In the treatment of cinchona-bark for removal of its medicinal constituents, the improvement consisting in treating the bark with an alkaline carbonate and then with an acid, (or vice versa,) and then separating the natural acids and alkaloids from their respective solutions, substantially as described.

4. In the treatment of cinchona-barks, the improvement consisting in acting on the bark successively with an acid and with an alkaline carbonate, then again treating the bark with an acid, and, finally, separating the alkaloids and acids from their respective solutions, substantially as described.

In testimony whereof I have signed this specification in the presence of two subscribing witnesses.

PAUL CASAMAJOR.

Witnesses:
ALBERT P. DAWSON,
WALTER J. WRIGHT.